(12) United States Patent
Navarro et al.

(10) Patent No.: US 11,281,808 B2
(45) Date of Patent: Mar. 22, 2022

(54) DETECTION AND REPAIR OF FAILED HARDWARE COMPONENTS

(71) Applicant: INTERNATIONAL BUSINESS MACHINES CORPORATION, Armonk, NY (US)

(72) Inventors: Markus Navarro, Tucson, AZ (US); Micah Robison, Tucson, AZ (US); Matthew G. Borlick, Tucson, AZ (US); Lokesh Mohan Gupta, Tucson, AZ (US); John Charles Elliott, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 185 days.

(21) Appl. No.: 16/775,118

(22) Filed: Jan. 28, 2020

(65) Prior Publication Data

US 2021/0232712 A1 Jul. 29, 2021

(51) Int. Cl.
| | |
|---|---|
| *G06F 11/07* | (2006.01) |
| *G06F 21/73* | (2013.01) |
| *G06F 21/86* | (2013.01) |
| *G06F 11/30* | (2006.01) |
| *G06F 11/10* | (2006.01) |
| *G06F 11/22* | (2006.01) |
| *G06F 11/00* | (2006.01) |

(52) U.S. Cl.
CPC ............ *G06F 21/73* (2013.01); *G06F 11/006* (2013.01); *G06F 11/0772* (2013.01); *G06F 11/0778* (2013.01); *G06F 11/1092* (2013.01); *G06F 11/221* (2013.01); *G06F 11/3006* (2013.01); *G06F 21/86* (2013.01)

(58) Field of Classification Search
CPC ........ G06F 21/73; G06F 21/86; G06F 11/006; G06F 11/0772; G06F 11/0778; G06F 11/1092; G06F 11/221; G06F 11/3006
USPC .............................. 714/4.12; 726/21, 34, 35
See application file for complete search history.

(56) References Cited

U.S. PATENT DOCUMENTS

| | | | |
|---|---|---|---|
| 6,985,877 B1 * | 1/2006 | Hayward | G06Q 10/06395 705/7.41 |
| 7,143,153 B1 | 11/2006 | Black et al. | |

(Continued)

FOREIGN PATENT DOCUMENTS

| | | | | |
|---|---|---|---|---|
| CN | 107004313 B * | 4/2021 | | G07C 9/00309 |
| WO | WO-2021009641 A1 * | 1/2021 | | G07C 9/00182 |

OTHER PUBLICATIONS

"System z Hardware Management Console Operations Guide", IBM Corporation, Version 2.9.1, 2006, pp. 208.

(Continued)

*Primary Examiner* — Chae M Ko
(74) *Attorney, Agent, or Firm* — Konrad Raynes Davda & Victor LLP; Rabindranath Dutta (57) ABSTRACT

A portable handheld device receives from a central repository, information on a failed hardware component of a computational device, wherein the information includes an authentication code to permit access to the failed hardware component and a time window in which the failed hardware component is permitted to be accessed. The portable handheld device uses the authentication code to access the failed hardware component for repair or replacement during the time window.

18 Claims, 10 Drawing Sheets

(56) References Cited

U.S. PATENT DOCUMENTS

| | | | |
|---|---|---|---|
| 7,263,597 B2 | 8/2007 | Everdell et al. | |
| 2003/0078029 A1* | 4/2003 | Petite | H04M 11/04 |
| | | | 455/404.1 |
| 2004/0061715 A1* | 4/2004 | Chu | G06Q 10/087 |
| | | | 715/709 |
| 2008/0080384 A1* | 4/2008 | Atkins | H04L 41/0631 |
| | | | 370/252 |
| 2012/0239973 A1* | 9/2012 | Walton | G06F 11/0712 |
| | | | 714/15 |
| 2012/0271645 A1* | 10/2012 | Dain | G06Q 10/00 |
| | | | 705/1.1 |
| 2014/0068247 A1* | 3/2014 | Davis | H04L 9/3228 |
| | | | 713/155 |
| 2015/0304851 A1* | 10/2015 | Chen | H04W 12/082 |
| | | | 713/172 |
| 2016/0098311 A1* | 4/2016 | Boecker | G06F 16/2425 |
| | | | 714/37 |
| 2016/0364699 A1 | 12/2016 | Steketee et al. | |
| 2018/0276872 A1* | 9/2018 | Case | G06F 16/9038 |
| 2018/0332016 A1* | 11/2018 | Pandey | H04L 63/108 |

OTHER PUBLICATIONS

"Agilent OpenLAB CDS Functional Design Specification", Agilent Technologies, Aug. 2016, pp. 96.

"Method of Component Failure Prediction in Large Server and Storage Systems", IP.com, IP.com No. IPCOM000191729D, Jan. 13, 2010, pp. 6.

"Component Authentication", IP.com, IP.com No. IPCOM000032461D, Nov. 5, 2004, pp. 2.

\* cited by examiner

DETECTION AND REPAIR OF FAILED HARDWARE COMPONENTS

BACKGROUND

1. Field

Embodiments relate to the detection and repair of failed hardware components.

2. Background

In certain storage system environments, a storage controller (or a storage controller complex) may comprise a plurality of storage servers that are coupled to each other. The storage controller allows host computing systems to perform input/output (I/O) operations with storage devices controlled by the storage controller, where the host computing systems may be referred to as hosts.

The storage controller may include two or more servers, where each server may be referred to as a node, a storage server, a processor complex, a Central Processor Complex (CPC), or a Central Electronics Complex (CEC). Each server may have a plurality of processor cores and the servers may share the workload of the storage controller. In a two server configuration of the storage controller that is also referred to as a dual server based storage controller, in the event of a failure of one of the two servers, the other server that has not failed may take over the operations performed by the failed server.

A storage controller may include many hardware components, such as a host bus adapter that is used for communication with the host computing system, a storage adapter that interfaces with storage devices controlled by the storage controller, etc. Such hardware components may malfunction and may have to be repaired or replaced.

SUMMARY OF THE PREFERRED EMBODIMENTS

Provided are a method, system, and computer program product in which a portable handheld device receives from a central repository, information on a failed hardware component of a computational device, wherein the information includes an authentication code to permit access to the failed hardware component and a time window in which the failed hardware component is permitted to be accessed. The portable handheld device uses the authentication code to access the failed hardware component for repair or replacement during the time window.

In additional embodiments, the information further includes a part number of the failed hardware component; a serial number of the failed hardware component; and a location information of the failed hardware component.

In further embodiments, a secure connection is established between the portable handheld device and the central repository to receive the information on the failed hardware.

In yet further embodiments, the portable handheld device transmits the authentication code to a door of the failed hardware component to open the door to allow access to the hardware component.

In certain embodiments, the door is permitted to be opened with the authentication code during the time window, and is not permitted to be opened outside of the time window.

In further embodiments, the computational device is a storage controller, wherein parts are ordered for delivery prior to the time window by an ordering mechanism that extracts the information maintained in the central repository, wherein the parts include replacement for a failed host bus adapter of the storage controller that allowed the storage controller to communicate with a host computational device.

In certain embodiments, the portable handheld device records a process of repairing or replacing the failed hardware device.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments. It is understood that other embodiments may be utilized and structural and operational changes may be made.

In certain situations when one or more hardware components in a storage controller fail, the storage controller may detect the failure when an operation within the storage controller encounters an error. This detection of failure may take place at a time when host Input/Output (I/O) has already been impacted by the failure of the one or more hardware components in the storage controller.

Certain embodiments provide a portable handheld device to receive from a central data repository token information related to a failed hardware component that has been approved for replacement at a customer data center. The token includes information such as part number, serial number for the machine, location within the data center of the machine, time window for the repair action, and authentication codes for access to the data center and to the machine. In certain embodiments, the portable handheld device communicates with the central data repository and the machine to be repaired using a secured, wireless communication protocol.

As a result, certain embodiments provide mechanisms that improve the detection and repair of failed components in a computer system and this provides improvements in the operation of the computer system.

Exemplary Embodiments

Figure 1:
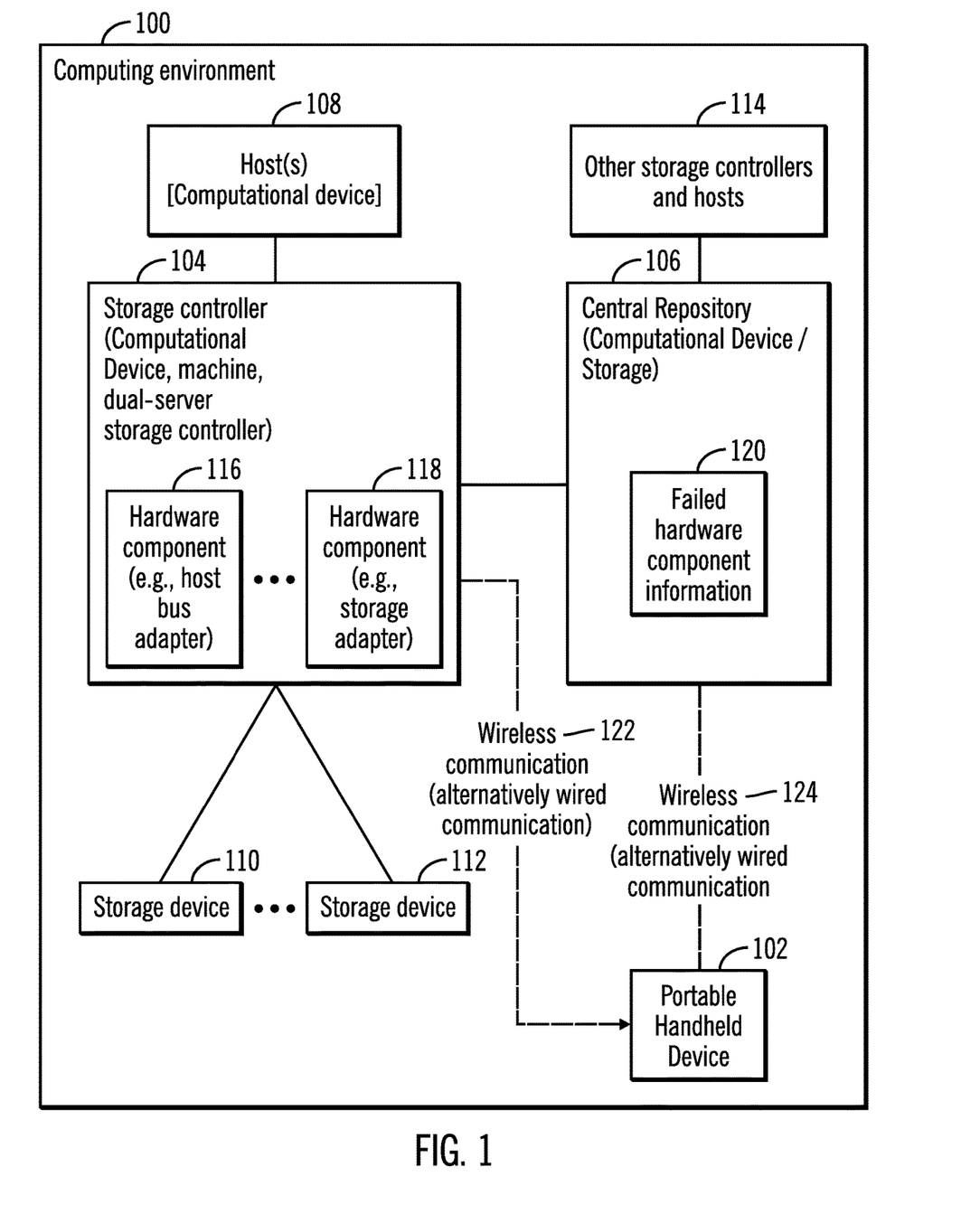
FIG. 1 illustrates a block diagram of a computing environment in which a portable handheld device uses information on failed hardware components of a storage controller stored in a central repository, to securely access the hardware components for repair or replacement, in accordance with certain embodiments.

FIG. 1 illustrates a block diagram of a computing environment 100 in which a portable handheld device 102 uses information on failed hardware components of storage controller 104 stored in a central repository 106, to securely access the hardware components for repair or replacement, in accordance with certain embodiments.

The storage controller 104 is coupled to one or more hosts 108 and one or more storage devices 110, 112, in accordance with certain embodiments. The storage controller 104 allows the one or more hosts 108 to perform input/output (I/O) operations with logical storage maintained by the storage controller 106. The physical storage corresponding to the logical storage may be found in one or more of the storage devices 110, 112 and/or a cache of the storage controller 106. Other storage controllers and hosts 114 may be included in the computing environment 100.

The storage controller 104 may include a plurality of hardware components 116, 118. For example, one of the hardware components may be a host bus adapter 116 that allows the storage controller 104 to communicate with the host 108, and another hardware component may be a storage adapter 118 that is a hardware interface to the storage devices 110, 112.

The storage controller 104 communicates information on failed (i.e., malfunctioning) hardware components to the central repository 106, where the central repository 106 stores in a data structure the failed hardware component information.

The potable handheld device 102 is capable of wirelessly communicating with the central repository 106 and the storage controller 104 (as shown via reference numerals 122, 124). In alternative embodiments, a wired communication may be used instead of wireless communication. The portable handheld device 102 downloads the failed hardware component information 120 from the central repository 106 and uses the failed hardware component information to securely allow access to the failed hardware components for repair or replacement.

The storage controller 104, the hosts 108, the other storage controller and hosts 114, and the central repository 106 may comprise any suitable computational device including those presently known in the art, such as, a personal computer, a workstation, a server, a mainframe, a hand held computer, a palm top computer, a telephony device, a network appliance, a blade computer, a processing device, a controller, etc. The portable handheld device 102 may comprise any handheld device including those presently known in the art, such as a cell phone, a palm top computational device, a tablet computer, etc.

The portable handheld device 102, the storage controller 104, the central repository 106, the hosts 108, the storage devices 110, 112, the other storage controller and hosts 114 may be elements in any suitable network, such as, a storage area network, a wide area network, the Internet, an intranet. In certain embodiments, the portable handheld device 102, the storage controller 104, the central repository 106, the hosts 108, the storage devices 110, 112, the other storage controller and hosts 114 may be elements in a cloud computing environment.

Therefore, FIG. 1 illustrates certain embodiments in which a portable handheld device 102 uses the failed hardware component information 120 stored in a central repository 106 to securely access failed hardware components in a storage controller 104 for repair or replacement.

Figure 2:
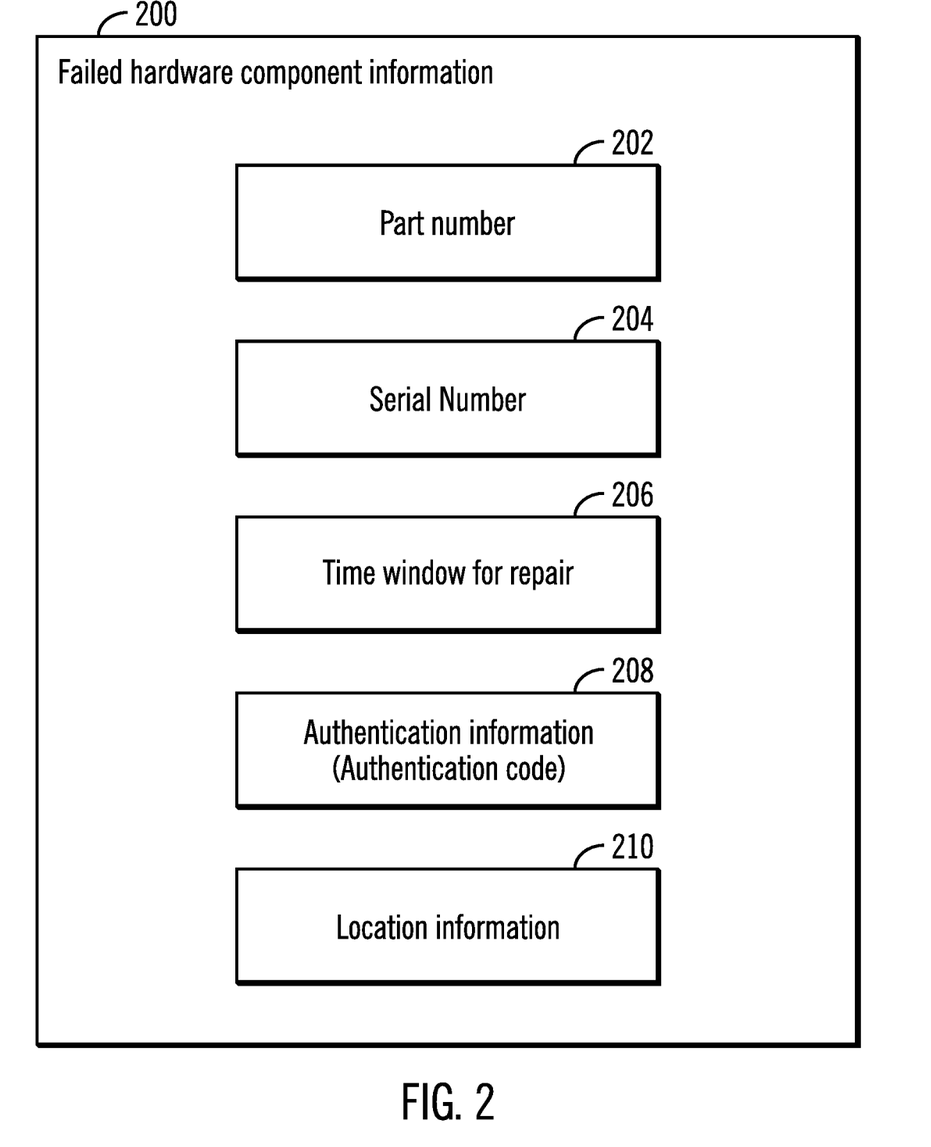
FIG. 2 illustrates a block diagram that shows the information on the failed hardware components stored in the central repository, in accordance with certain embodiments.

FIG. 2 illustrates a block diagram that shows the information on the failed hardware components 200 stored in the central repository 106, in accordance with certain embodiments.

The information on a failed hardware component may include the part number 202 and serial number 204 of the failed hardware component. A time window for repair 206 may also be stored. The time window for repair 206 may be provided by the storage controller 104 to allow repair or replacement of the hardware component while minimizing disruption to the functioning of the storage controller. For example, the time window for repair may be from 4 PM to 6 PM on a Friday when fewer users are likely to use the storage controller or when the load on the storage controller is anticipated to be lower than usual.

An authentication information 208 may be included for the failed hardware component information. The authentication information 208 is used by the portable handheld device 102 to authenticate the portable handheld device 102 to access control mechanisms of the failed hardware component. The location information 210 (e.g., physical location within a data center) of the failed hardware component may also be stored.

Figure 3:
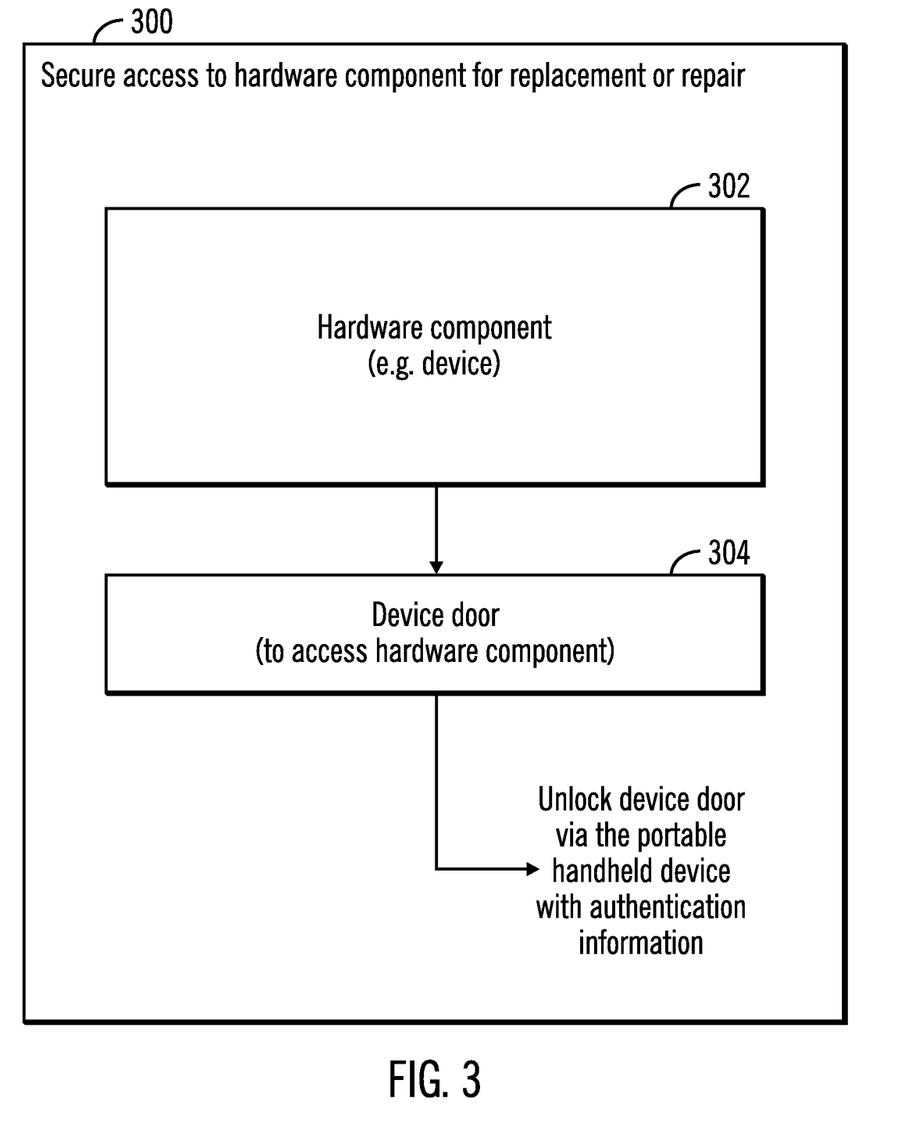
FIG. 3 illustrates a block diagram that shows secure access mechanisms to a hardware component for replacement or repair, in accordance with certain embodiments.

FIG. 3 illustrates a block diagram 300 that shows secure access mechanisms to a hardware component for replacement or repair, in accordance with certain embodiments. A hardware component 302 (e.g., a device) may have an associated device door 304 that needs to be opened for accessing the hardware component 302. The device door 304 may be a locked physical guard for the hardware component 302. In certain embodiments, the portable handheld device 102 unlocks the device door 304 by using the authentication information 208.

Figure 4:
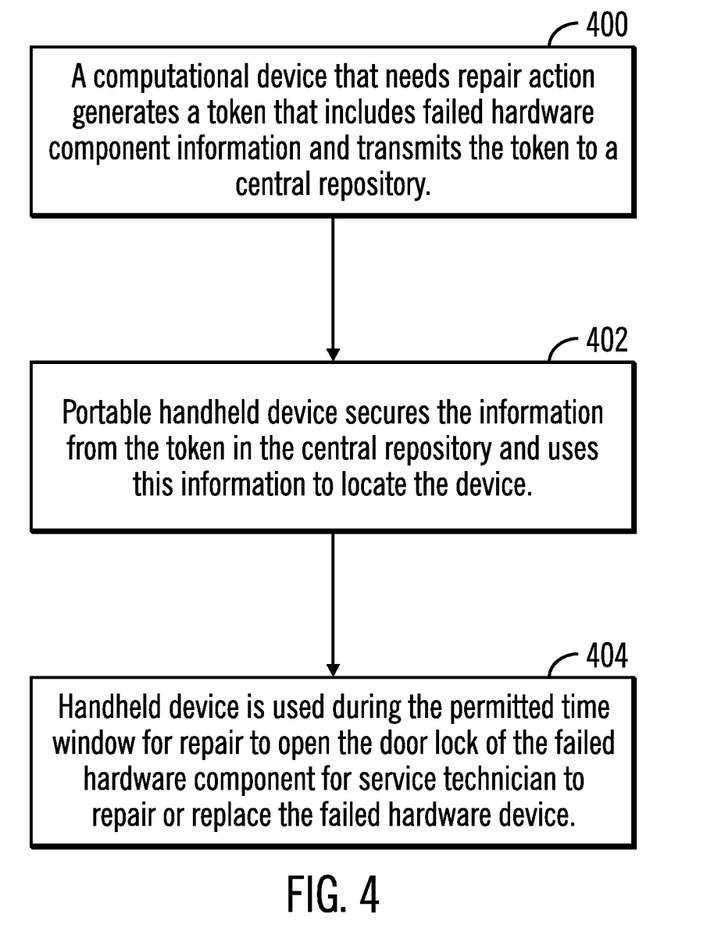
FIG. 4 illustrates a first flowchart for secure replacement or repair of a hardware component, in accordance with certain embodiments.

FIG. 4 illustrates a first flowchart for secure replacement or repair of a hardware component, in accordance with certain embodiments. The operations shown in FIG. 4 may be performed at least by the portable handheld device 102 and other elements in the computing environment 100.

Control starts at block 400 in which a computational device (e.g., storage controller 104) that needs a repair action generates a token that includes failed hardware component information and transmits the information to a central repository 106.

The portable handheld device 102 secures the information from the token in the central repository and uses this information to locate the failed hardware device (at block 402). Control proceeds to block 404 in which the portable handheld device 102 is used during the permitted time window for repair to open the door lock of the failed hardware component for a service technician to repair or replace the hardware device.

Figure 5:
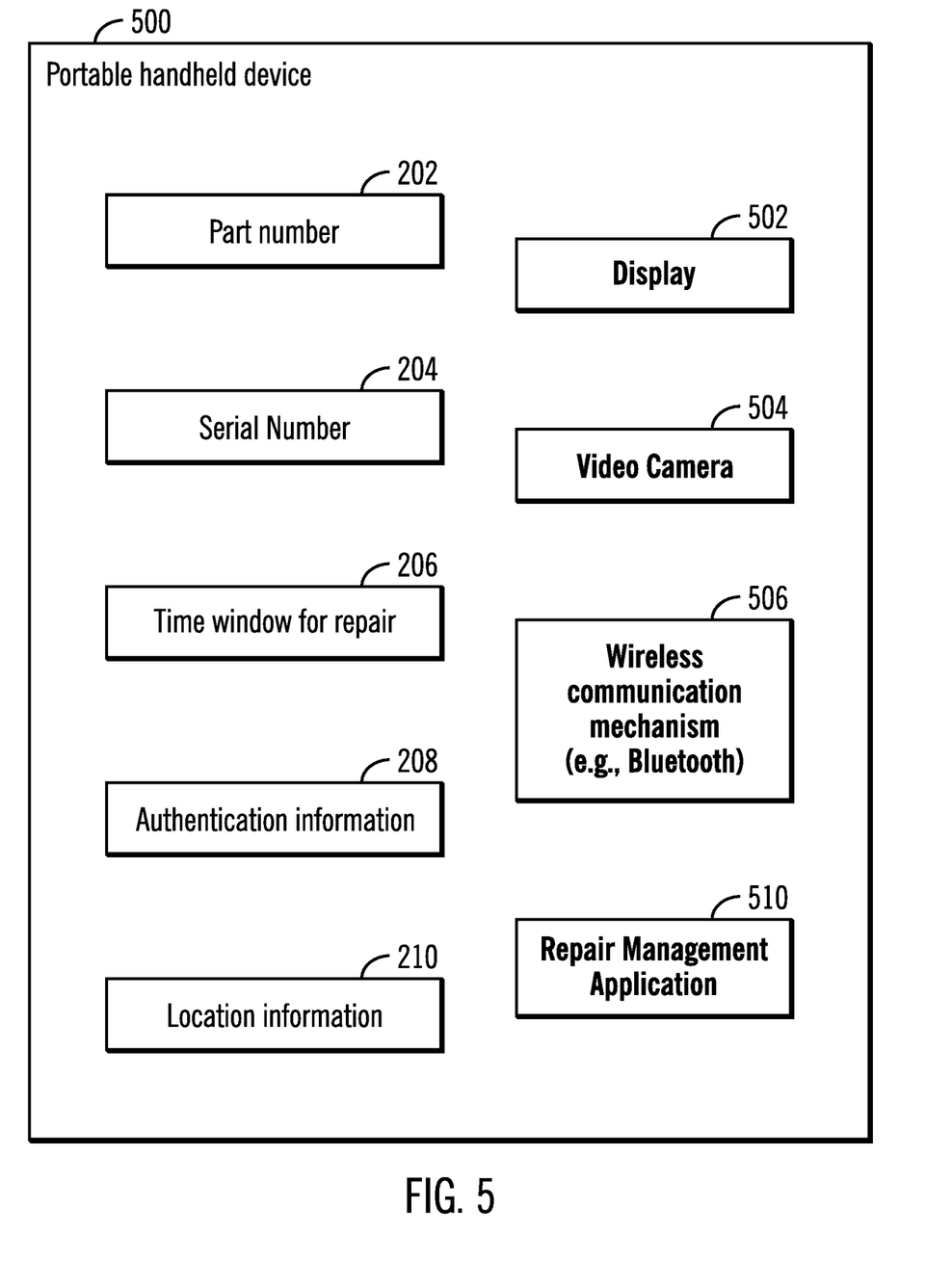
FIG. 5 illustrates a block diagram of a portable handheld device used for the replacement or repair of a hardware component, in accordance with certain embodiments.

FIG. 5 illustrates a block diagram of a portable handheld device 500 used for the replacement or repair of a hardware component, in accordance with certain embodiments.

In addition to the part number 202, the serial number 204, the time window for repair 206, the authentication information 208, and the location information 210, the portable handheld device 500 includes a display 502, a video camera 504, a wireless communication mechanism 506 (e.g., Bluetooth), and a repair management application 510. The display 502 shows instructions to a user. The video camera 504 may record the repair and replacement phase. The wireless communication mechanism 506 is used for wirelessly connecting the portable handheld device to other devices. The operations performed by the portable handheld device 500 are performed by the repair management application 510 that executes in the portable handheld device 102.

Figure 6:
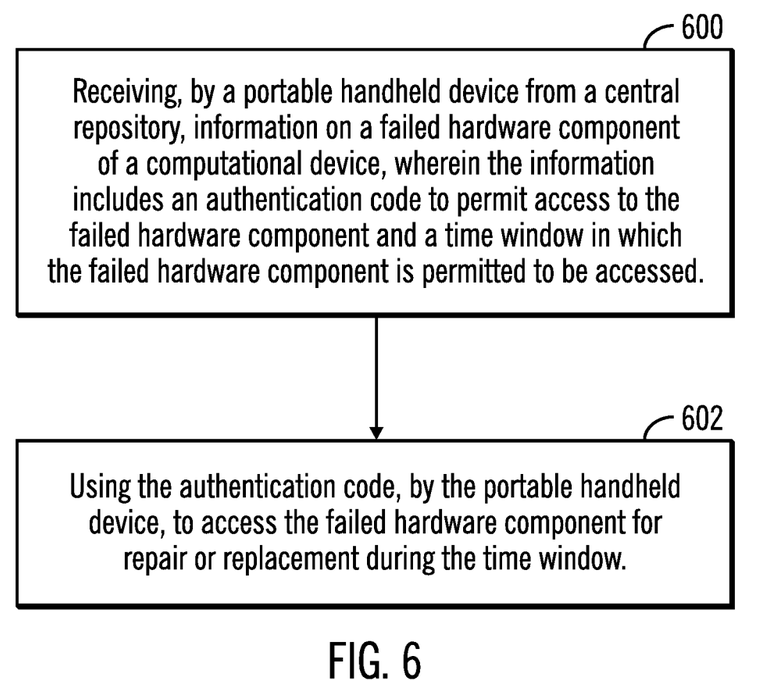
FIG. 6 illustrates a second flowchart for secure replacement or repair of a hardware component, in accordance with certain embodiments.

FIG. 6 illustrates a second flowchart for secure replacement or repair of a hardware component, in accordance with certain embodiments. The operations shown in FIG. 6 may be performed by the portable handheld device 102.

Control starts at block 600 in which a portable handheld device 102 receives from a central repository 106, information on a failed hardware component 120 of a computational device 104 (e.g., storage controller 104), wherein the information includes an authentication code 208 to permit access to the failed hardware component and a time window 206 in which the failed hardware component is permitted to be accessed. The portable handheld device 102 uses (at block 602) the authentication code 208 to access the failed hardware component for repair or replacement during the time window.

Figure 7:
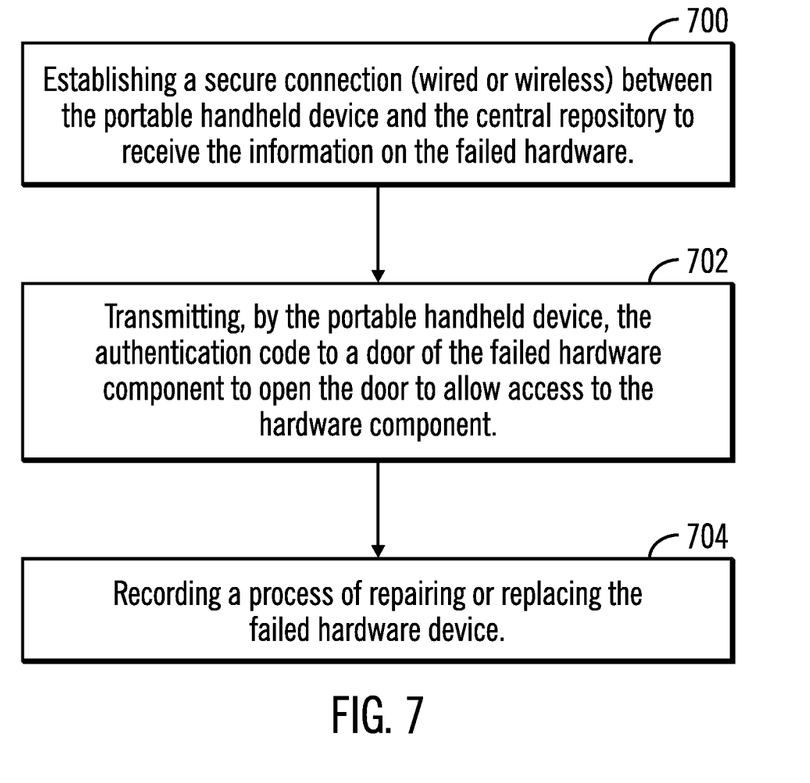
FIG. 7 illustrates a third flowchart for secure replacement or repair of a hardware component, in accordance with certain embodiments.

FIG. 7 illustrates a third flowchart for secure replacement or repair of a hardware component, in accordance with certain embodiments. The operations shown in FIG. 7 may be performed by the portable handheld device 102.

Control starts at block 700 in which a secure connection (wired or wireless) is established between the portable handheld device 102 and the central repository 106 to receive the information on the failed hardware.

Control proceeds to block 702 in which the portable handheld device 102 transmits the authentication code to a door of the failed hardware component to open the door to allow access to the hardware component. In certain embodiments, the door is permitted to be opened with the authentication code during the time window, and is not permitted to be opened outside of the time window. Parts are ordered for delivery prior to the time window by an ordering mechanism that extracts the information maintained in the central repository 106, wherein the parts may include replacement for a failed host bus adapter of the storage controller that allowed the storage controller to communicate with a host computational device or other parts From block 702 control proceeds to block 704 in which the portable handheld device 102 records a process of repairing or replacing the failed hardware device. As a result proof is maintained of the repair process.

Therefore, FIGS. 1-7 illustrate certain embodiment in which a portable handheld device 102 is used to securely access a failed hardware component for repair or replacement.

Cloud Computing Environment

Cloud computing is a model for enabling convenient, on-demand network access to a shared pool of configurable computing resources (e.g., networks, servers, storage, applications, and services) that can be rapidly provisioned and released with minimal management effort or service provider interaction.

Figure 8:
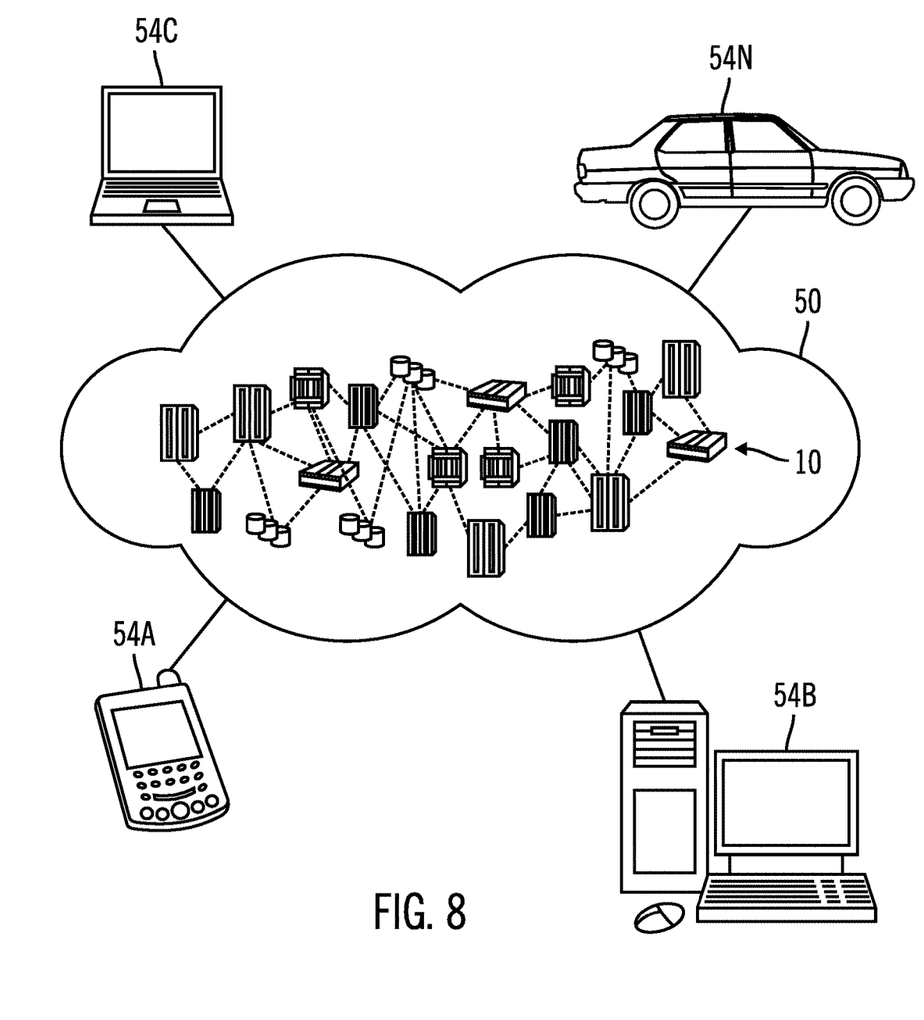
FIG. 8 illustrates a block diagram of a cloud computing environment for implementing the operations described in FIGS. 1-7, in accordance with certain embodiments.

Referring now to FIG. 8 an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
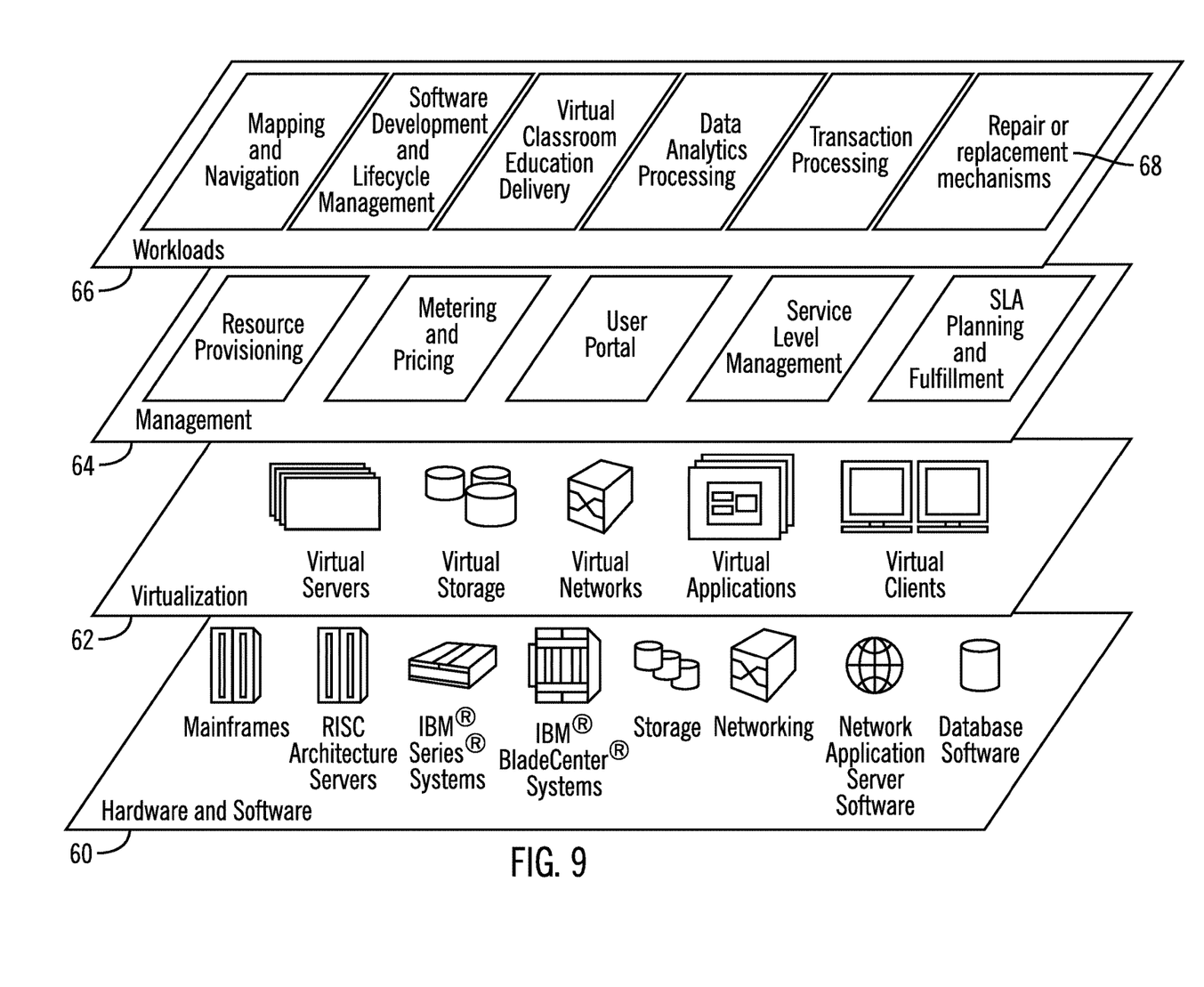
FIG. 9 illustrates a block diagram that shows further details of the cloud computing environment of FIG. 8, in accordance with certain embodiments.
Figure 10:
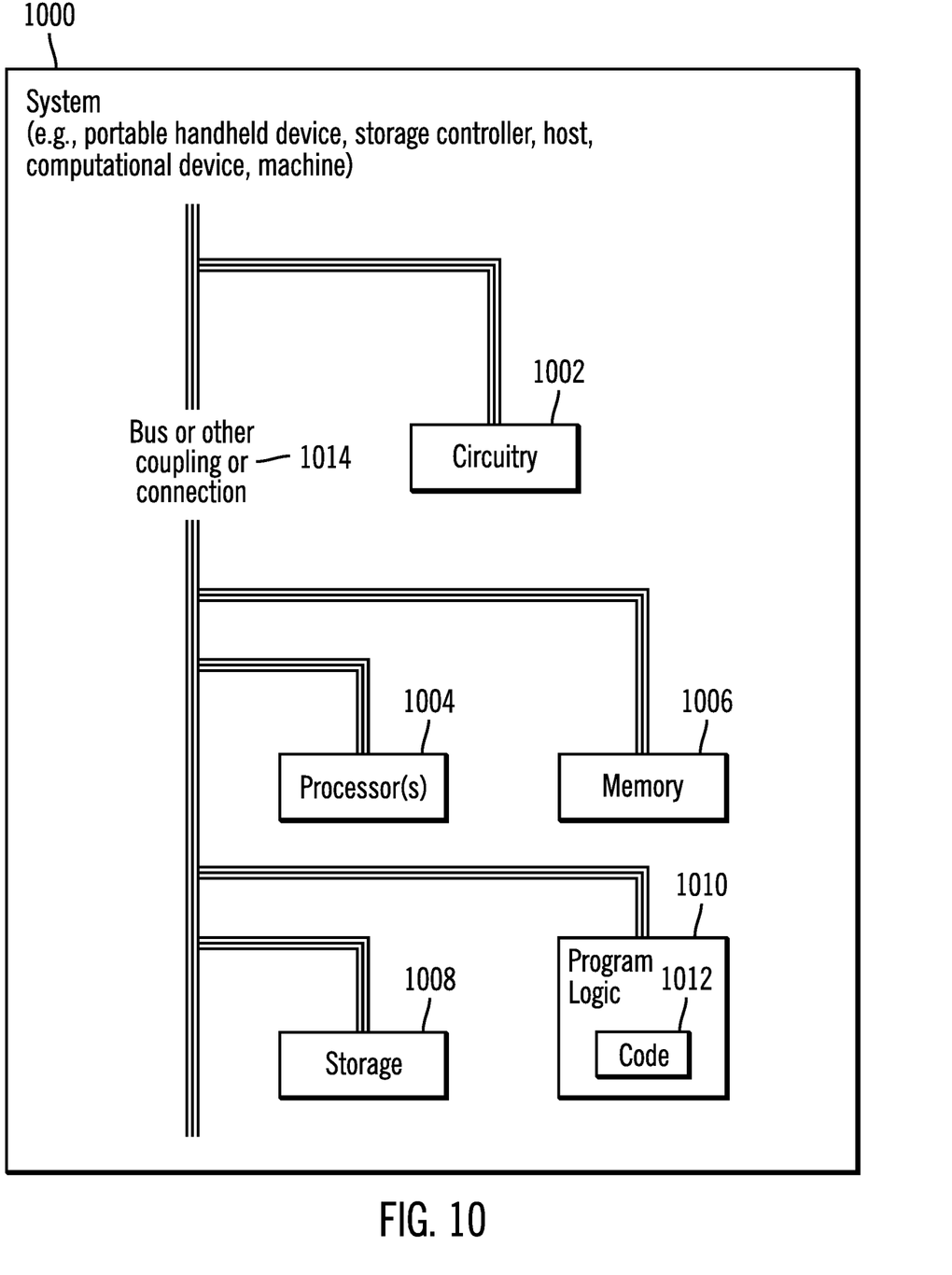
FIG. 10 illustrates a block diagram of a computational system, in accordance with certain embodiments.

Referring now to FIG. 9, a set of functional abstraction layers provided by cloud computing environment 50 (FIG. 8) is shown. It should be understood in advance that the components, layers, and functions shown in FIG. 10 are intended to be illustrative only and embodiments of the invention are not limited thereto.

Hardware and software layer 60 includes hardware and software components. Examples of hardware components include mainframes, in one example IBM ZSERIES* systems; RISC (Reduced Instruction Set Computer) architecture based servers, in one example IBM PSERIES* systems; IBM XSERIES* systems; IBM BLADECENTER* systems; storage devices; networks and networking components. Examples of software components include network application server software, in one example IBM WEBSPHERE* application server software; and database software, in one example IBM DB2* database software.

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and repair or replacement mechanisms 68 as shown in FIGS. 1-9.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the present embodiments are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instruction.

FIG. 10 illustrates a block diagram that shows certain elements that may be included in the portable handheld device 102, the storage controller 104, the host 108, a computational device or a machine. The system 1000 may include a circuitry 1002 that may in certain embodiments include at least a processor 1004. The system 1000 may also include a memory 1006 (e.g., a volatile memory device), and storage 1008. The storage 1008 may include a non-volatile memory device (e.g., EEPROM, ROM, PROM, flash, firmware, programmable logic, etc.), magnetic disk drive, optical disk drive, tape drive, etc. The storage 1008 may comprise an internal storage device, an attached storage device and/or a network accessible storage device. The system 1000 may include a program logic 1010 including code 1012 that may be loaded into the memory 1006 and executed by the processor 1004 or circuitry 1002. In certain embodiments, the program logic 1010 including code 1012 may be stored in the storage 1008. In certain other embodiments, the program logic 1010 may be implemented in the circuitry 1002. One or more of the components in the system 1000 may communicate via a bus or via other coupling or connection 1014. While FIG. 10 shows the program logic 1010 separately from the other elements, the program logic 1010 may be implemented in the memory 1006 and/or the circuitry 1002.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article may be used in place of a single device/article. Similarly, where more than one device or article is described herein, it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

*IBM, ZSERIES, PSERIES, XSERIES, BLADECENTER, WEBSPHERE, AND DB2 are trademarks or registered trademarks of International Business Machines Corporation registered in many jurisdictions worldwide.

What is claimed is:

1. A method, comprising:
receiving, by a portable handheld device from a central repository, information on a failed hardware component of a storage controller, wherein the information includes an authentication code to permit access to the failed hardware component and a time window in which the failed hardware component is permitted to be accessed; and
using the authentication code, by the portable handheld device, to access the failed hardware component for repair or replacement during the time window, wherein parts are ordered for delivery prior to the time window by an ordering mechanism that extracts the information maintained in the central repository, and wherein the parts include replacement for a failed host bus adapter of the storage controller that allowed the storage controller to communicate with a host computational device.

2. The method of claim 1, wherein the information further includes:
a part number of the failed hardware component;
a serial number of the failed hardware component; and
a location information of the failed hardware component.

3. The method of claim 2, the method further comprising:
establishing a secure connection between the portable handheld device and the central repository to receive the information on the failed hardware component.

4. The method of claim 3, the method further comprising:
transmitting, by the portable handheld device, the authentication code to a door of the failed hardware component to open the door to allow access to the failed hardware component.

5. The method of claim 4, wherein the door is permitted to be opened with the authentication code during the time window, and is not permitted to be opened outside of the time window.

6. The method of claim 1, wherein the portable handheld device records a process of repairing or replacing the failed hardware device component.

7. A system, comprising:
a memory; and
a processor coupled to the memory, wherein the processor performs operations, the operations comprising:
receiving, from a central repository, information on a failed hardware component of a storage controller, wherein the information includes an authentication code to permit access to the failed hardware component and a time window in which the failed hardware component is permitted to be accessed; and
using the authentication code to access the failed hardware component for repair or replacement during the time window, wherein parts are ordered for delivery prior to the time window by an ordering mechanism that extracts the information maintained in the central repository, and wherein the parts include replacement for a failed host bus adapter of the storage controller that allowed the storage controller to communicate with a host computational device.

8. The system of claim 7, wherein the information further includes:
a part number of the failed hardware component;
a serial number of the failed hardware component; and
a location information of the failed hardware component.

9. The system of claim 8, the operations further comprising:
establishing a secure connection between the system and the central repository to receive the information on the failed hardware component.

10. The system of claim 9, the operations further comprising:
transmitting the authentication code to a door of the failed hardware component to open the door to allow access to the failed hardware component.

11. The system of claim 10, wherein the door is permitted to be opened with the authentication code during the time window, and is not permitted to be opened outside of the time window.

12. The system of claim 7, wherein the system is a portable handheld device, and wherein the portable handheld device records a process of repairing or replacing the failed hardware device component.

13. A computer program product, the computer program product comprising a computer readable storage medium having computer readable program code embodied therewith, the computer readable program code configured to perform operations on a processor of a portable handheld device, the operations comprising:
receiving, by the portable handheld device from a central repository, information on a failed hardware component of a storage controller, wherein the information includes an authentication code to permit access to the failed hardware component and a time window in which the failed hardware component is permitted to be accessed; and
using the authentication code, by the portable handheld device, to access the failed hardware component for repair or replacement during the time window, wherein parts are ordered for delivery prior to the time window by an ordering mechanism that extracts the information maintained in the central repository, and wherein the parts include replacement for a failed host bus adapter of the storage controller that allowed the storage controller to communicate with a host computational device.

14. The computer program product of claim 13, wherein the information further includes:
a part number of the failed hardware component;
a serial number of the failed hardware component; and
a location information of the failed hardware component.

15. The computer program product of claim 14, the operations further comprising:
establishing a secure connection between the portable handheld device and the central repository to receive the information on the failed hardware component.

16. The computer program product of claim 15, the operations further comprising:
transmitting, by the portable handheld device, the authentication code to a door of the failed hardware component to open the door to allow access to the failed hardware component.

17. The computer program product of claim 16, wherein the door is permitted to be opened with the authentication code during the time window, and is not permitted to be opened outside of the time window.

18. The computer program product of claim 13, wherein the portable handheld device records a process of repairing or replacing the failed hardware component.

* * * * *